United States Patent [19]

Ishii

[11] Patent Number: 5,411,363
[45] Date of Patent: May 2, 1995

[54] CASE UNLOADING APPARATUS

[76] Inventor: Toru Ishii, 66 Takaokacho, Matsuyama, Ehime-Pref., Japan

[21] Appl. No.: 228,327

[22] Filed: Jan. 18, 1994

Related U.S. Application Data

[63] Continuation of Ser. No. 955,490, Oct. 2, 1992, abandoned.

[30] Foreign Application Priority Data

Oct. 2, 1991 [JP] Japan .................... 3-088881 U

[51] Int. Cl.6 .................................. B65G 59/06
[52] U.S. Cl. .................. 414/797.5; 414/795.9; 414/798.1
[58] Field of Search .................. 414/417, 798.9, 795.2, 414/795.3, 795.9, 797, 797.4, 797.5, 797.8, 798, 798.1

[56] References Cited

U.S. PATENT DOCUMENTS

| | | | |
|---|---|---|---|
| 2,702,132 | 2/1955 | Van Doren | 414/797.5 |
| 3,055,478 | 4/1962 | Du Broff et al. | 414/795.9 |
| 3,096,891 | 7/1963 | Verrinder et al. | 414/798 |
| 3,139,993 | 7/1964 | Lauer | 414/797.5 |
| 3,388,817 | 6/1968 | Johnson | 414/797.5 |
| 3,523,617 | 8/1970 | Raynor et al. | 414/797.5 |
| 4,753,564 | 6/1988 | Pearce et al. | 414/797 |

FOREIGN PATENT DOCUMENTS

| | | | |
|---|---|---|---|
| 1174866 | 10/1964 | Germany | 414/797.5 |
| 120172 | 9/1979 | Japan | 414/798 |
| 145935 | 11/1980 | Japan | 414/797.5 |

*Primary Examiner*—Michael S. Huppert
*Assistant Examiner*—Gregory A. Morse
*Attorney, Agent, or Firm*—Moonray Kojima

[57] ABSTRACT

The invention presents a case unloading apparatus for mechanically loading or unloading cases formed in square, trapezoid or other shapes, in which:
case groups of plural rows stacked up on a pallet are aligned in an unloading direction, transferred on an elevating conveyor sequentially by one row each, and upper case groups excluding the bottom case stacked up on the elevating conveyor are held in the horizontal position by right and left holding arms, at the same time, by lowering the elevating conveyor and separating the bottom case, the case of the separated bottom stage is transferred on a feed conveyor, and therefore the cases formed in a smooth side surfaces not possessing the shape or structure for holding by hand may be unloaded mechanically.

5 Claims, 14 Drawing Sheets

F I G. 6
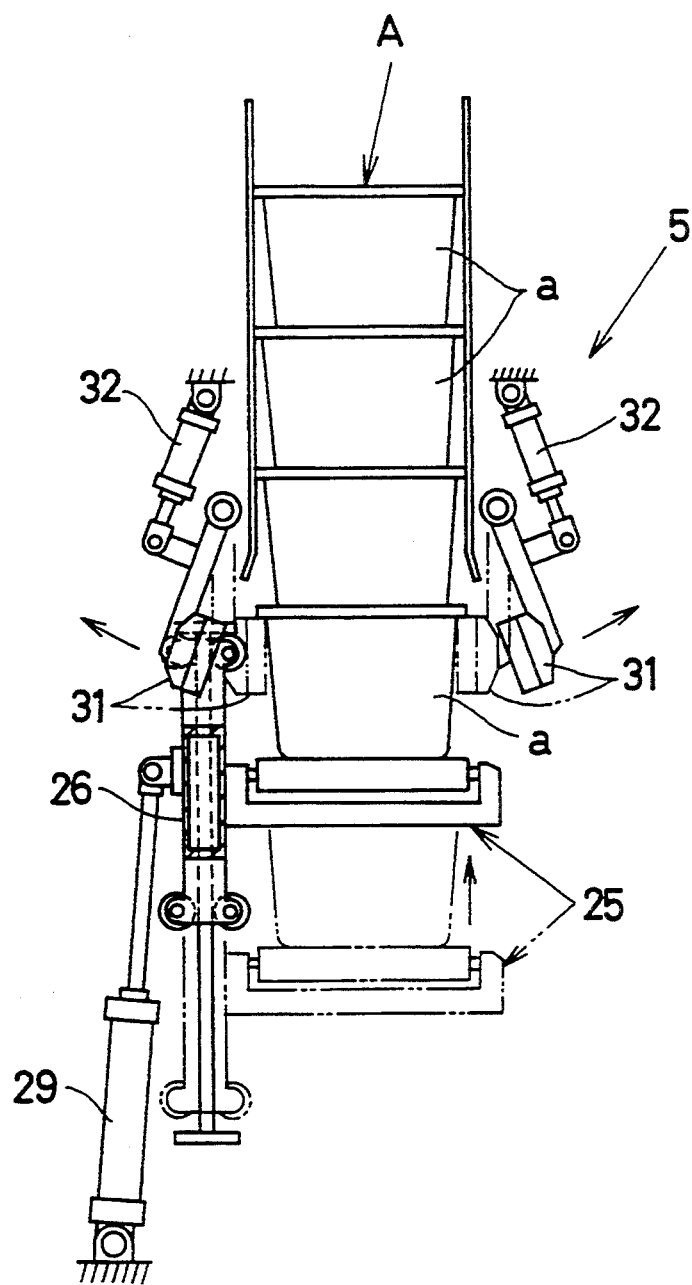

CASE UNLOADING APPARATUS

This is a continuation of Ser. No. 07/955,490, filed Oct. 2, 1992, now abandoned.

SUMMARY OF THE INVENTION

The present invention relates to a case unloading apparatus for mechanically loading or unloading cases formed in square, trapezoid or other shapes, in which:
case groups of plural rows stacked up on a pallet are aligned in an unloading direction, transferred on an elevating conveyor sequentially by one row each, and upper case groups excluding the bottom case stacked up on the elevating conveyor are held in the horizontal position by right and left holding arms, at the same time, by lowering the elevating conveyor and separating the bottom case, the case of the separated bottom stage is transferred on a feed conveyor, and therefore the cases formed in a smooth side surfaces not possessing the shape or structure for holding by hand may be unloaded mechanically.

BACKGROUND OF THE INVENTION

As a method of sequentially unloading a multiplicity of cases stacked up on a pallet, hitherto, for example, a method of separating sequentially by one case each by lifting by hand heavy cases containing objects from the top side of the case group stacked up in plural rows on a pallet by a plurality of workers is known.

However, when sequentially unloading a multiplicity of cases one by one by the hands of workers as mentioned above, a plurality of workers should be required for separating case groups stacked up in plural rows on a pallet in a short time, and moreover heavy cases containing objects are lifted by hand from the top stage and separated sequentially, and it takes time and labor for separating case groups in plural rows, and the working efficiency is poor.

Besides, the number of stacks of the case groups stacked up on the pallet is limited to the height that can be separated by the hands of the workers, and still more when separating cases with a smooth side surface such as corrugated cartons, the hands are likely to slip when the case stacked up on the top of the case group is lifted, and it is difficult to lift and separate the heavy case containing objects.

OBJECTS OF THE INVENTION

It is a first object of the invention to present a case unloading apparatus for mechanically unloading cases formed in square, trapezoid or other shapes, saving labor in work, and enhancing the efficiency, by aligning a multiplicity of cases stacked up on a pallet, and sequentially separating the case group of one row from the bottom stage.

It is a second object of the invention to present a case loading apparatus for mechanically loading cases, saving labor in work, and enhancing the efficiency, by first stacking up cases in a specified number of stages, then unloading onto a pallet.

BRIEF DESCRIPTION OF THE DRAWINGS

FIG. 6 is a front view showing the case lifting action by a case separating machine.

DETAILED DESCRIPTION OF THE PREFERRED EMBODIMENT

An embodiment of the invention is described below by referring to the accompanying drawings.

Figure 1:
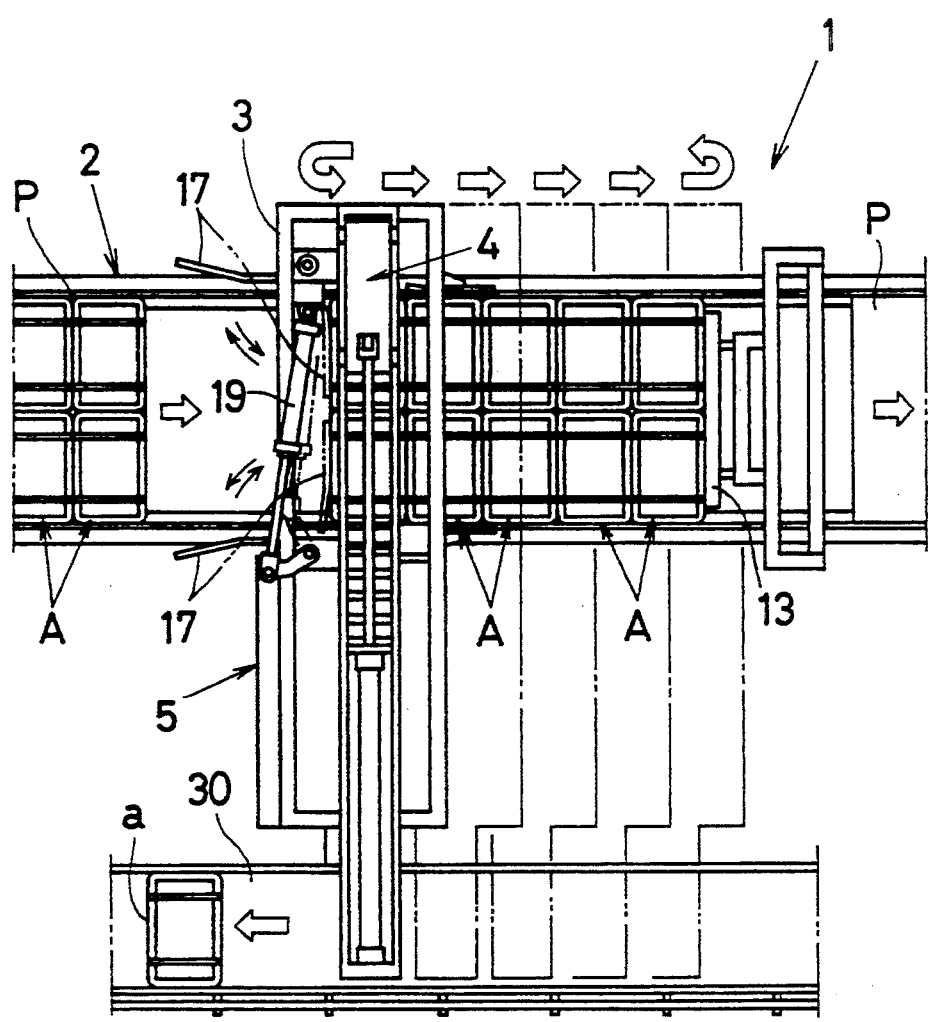
FIG. 1 is a plan view showing the unloading action by a case unloading apparatus of the invention.

FIG. 1 shows a case unloading apparatus 1 in the first embodiment for sequentially unloading a multiplicity of cases a stacked up on a pallet P, and this case unloading apparatus 1 places, for example, the pallet P on which 50 cases a are stacked up onto a transporting conveyor 2, conveys the pallet P to the case unloading position determined on the transporting conveyor 2, moves sequentially an apparatus main body 3 to the position corresponding to case groups A, A of the first row to fifth row stacked up on the pallet P, drives a case unloading machine 4 installed at the unloading side of the apparatus main body 3, unloads sequentially the case groups A, A of the first row to fifth row stacked up on the pallet P, drives a case separating machine 5 installed at the separating side of the apparatus main body 3, and sequentially separates the case groups A, A of one row portion stacked up in five rows from the bottom stage side.

Figure 2:
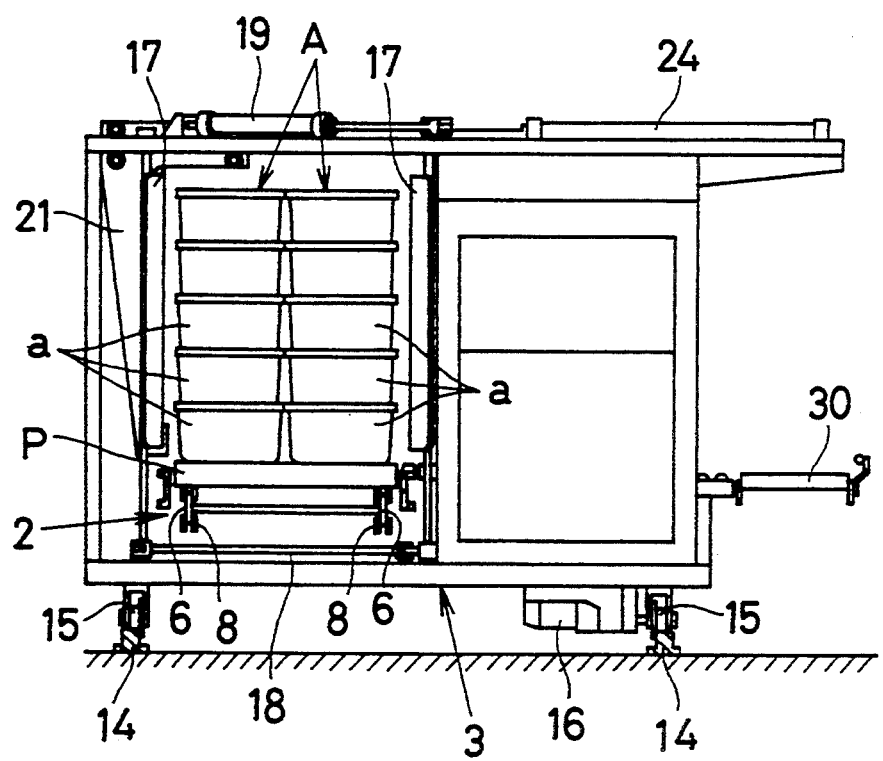
FIG. 2 is a side view of the case unloading apparatus.
Figure 3:
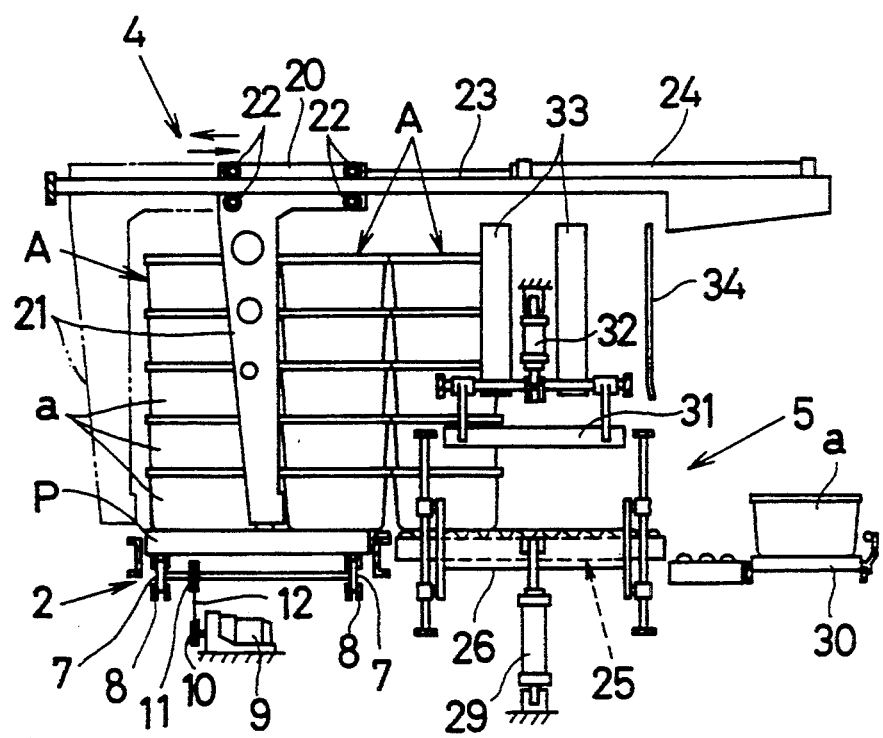
FIG. 3 Is a side view showing the unloading action by a case unloading machine.

The transporting conveyor 2 synchronously rotates two feed chains 8, 8 stretched between sprockets 6, 6 borne at the conveying side start end portion and sprockets 7, 7 borne at the conveying side terminal end portion as shown in FIGS. 2, 3, in the conveying direction. The sprockets 7 are driven be the sprockets 10, 11 and chain 12 by the driving force of a feed motor 9 with reduction gear, and conveys the pallet P placed on the feed chains 8, 8 to the case unloading position determined on the way of conveyance. After case unloading, an empty pallet P put on the feed chains 8, 8 is conveyed and supplied to a pallet stacking machine (not shown) installed at the feed side terminal end portion, and stacked up and collected. In addition, an aligning plate 13 is set up at the height position confronting the case groups A, A stacked up at the feed side front end portion of the pallet P at the pallet discharge side of the case unloading position determined on the transporting conveyor 2.

The apparatus main body 3 has traveling rails 14, 14 laid on the lower floor parallel to the conveying direction of the transporting conveyor 2, and with the traveling rails 14, 14 engaged with wheels 15, 15 borne at the lower side of the apparatus main body 3, drives and moves the case groups A, A for one row portion stacked up on the pallet P intermittently by the moving stroke, by the driving force of a traveling motor 16 with reduction gear installed on the bottom of the apparatus main body 3. At the pallet incoming side of the apparatus main body 3, pressure plates 17, 17 are borne free to open and close laterally, at a broader interval than the conveying width of the transporting conveyor 2, and the lower ends of the pressure plates 17, 17 borne on both sides are linked by a closing arm 18, and a piston rod of a closing cylinder 19 disposed on the upper part of the same side (see FIGS. 1,2) is linked with the upper end of the pressure plate 17 borne on one side (see FIGS. 1,2), and by the action of this closing cylinder 19, thereby rotating between the closing position opposite to one side of the case groups A, A stacked up at the feed side terminal end portion of the pallet P, and the opening position for allowing to pass the case groups A, A stacked up at both ends of the feed side of the pallet P, by the action of the closing cylinder 19.

The case unloading machine 4 has a slender case unloading plate 21 formed in a size confronting the unloading side rear face of the case group A stacked up in five stages, set up vertically in the lower part of the traveling unit 20 for composing the machine, and guide rollers 22, 22 borne at both sides of the traveling unit 20 are engaged with traveling guides 23, 23 erected toward the upper part of the separating side from the unloading side upper part of the apparatus main body 3, and the piston rod of the unloading cylinder 24 disposed in the upper part of the apparatus main body 3 is linked and fixed to the traveling unit 20, and by the action of the unloading cylinder 24, the case unloading plate 21 is moved back and forth between the backward position confronting the case group A in the unloading wide rear row of the pallet P stacked up on the transporting conveyor 2, and the forward position for mounting the case groups A, A for one row portion on the transporting conveyor 25 of the case separating machine 5 described below.

Figure 4:
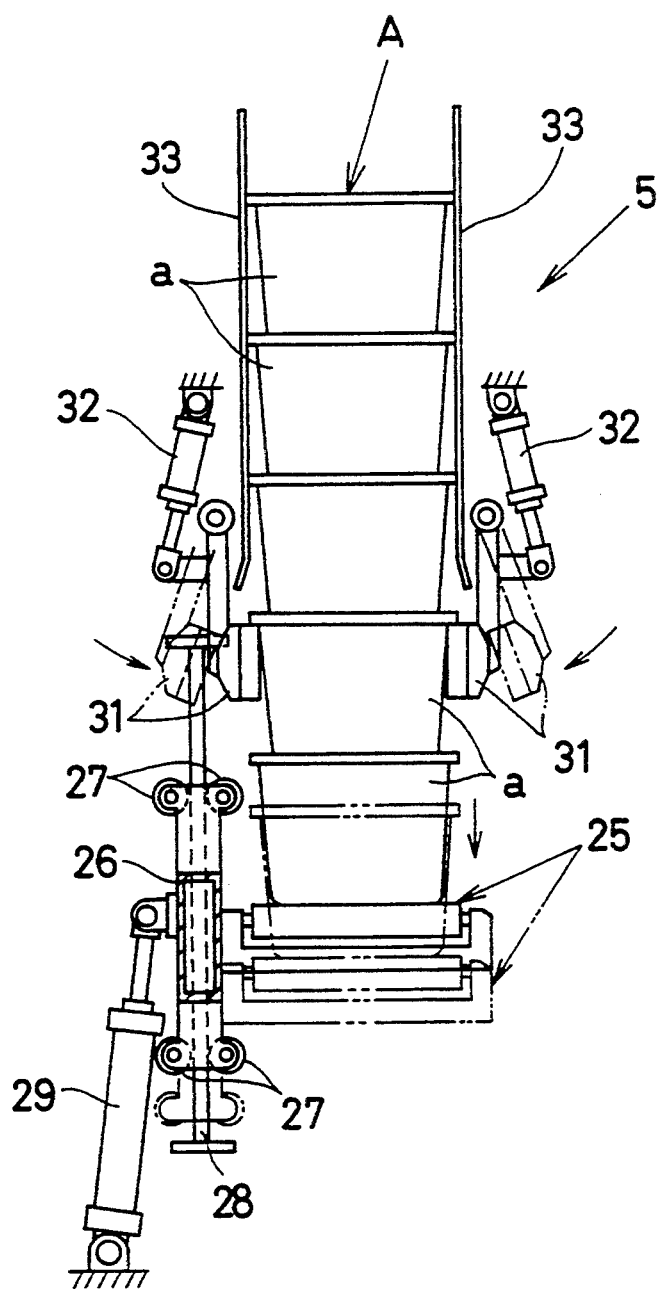
FIG. 4 is a front view showing the case holding state by a case separating machine.
Figure 5:
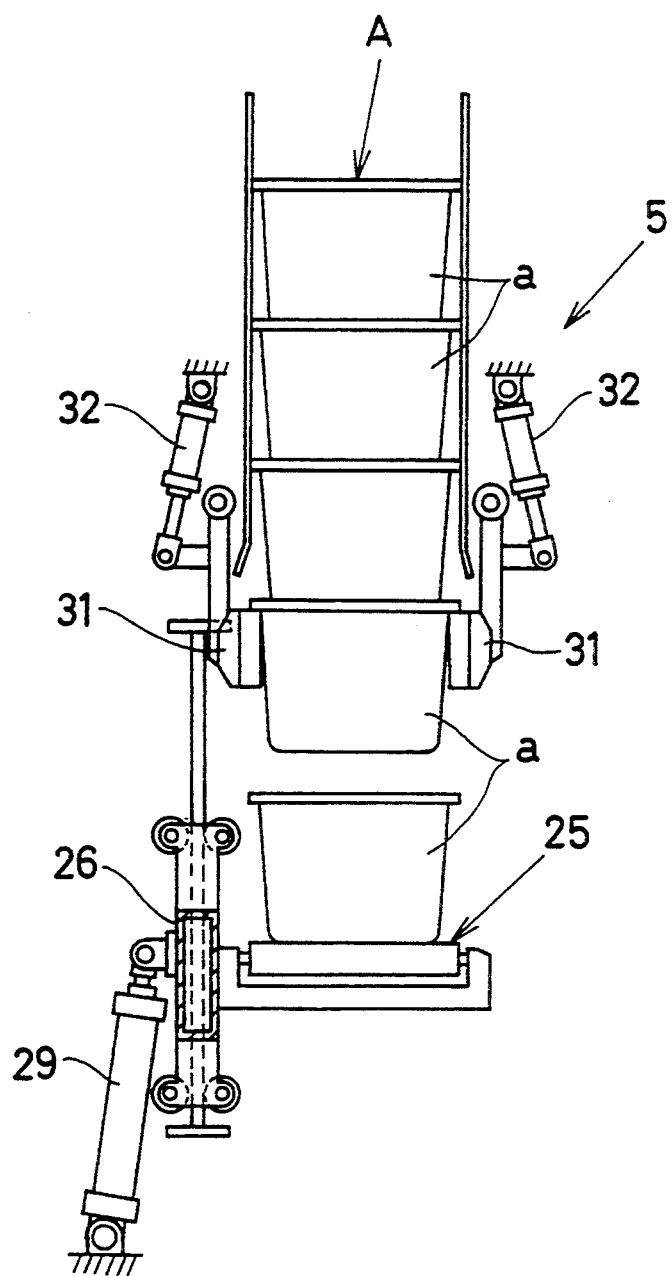
FIG. 5 is a front view showing the case separating action by a case separating machine.

The case separating machine 5 has, as shown in FIGS. 4, 5, and 6, an elevating frame 26 linked and fixed to one side of the lifting conveyor 25 formed in a size for mounting the case groups A, A for one row, and guide rollers 27, 27 borne at both ends of the upper and lower parts of the elevating frame 26 are respectively engaged with guide rails 28, 28 set up at both side positions, and the piston rod of the elevating cylinder 27 disposed in the lower part of the same side is linked and fixed to the elevating frame 26, thereby elevating and stopping the elevating conveyor, by the function of the elevating cylinder 29, at the middle position horizontal to the pallet P conveyed to the case unloading position of the transporting conveyor 2 mentioned above, the upper stage position for mounting the cases a, a held in the horizontal position by holding arms 31, 31 mentioned later, and the lower stage position horizontal to the feed conveyor 30 disposed at the height position for separating the cases a, a of the bottom stage.

The holding arms 31, 31 are rotatably pivoted at the right and left positions confronting the both sides of the cases a, a stacked up on tile second stage from the bottom on the elevating conveyor 25 stopped at the middle stage position, and piston rods of the holder cylinders 32, 32 disposed at both sides of the upper part of the same position are linked and fixed to the holding arms 31, 31, and by the rotation motion of the holding cylinders 32, 32, the holding arms 31, 31 are rotated and stopped at the closing position for holding the cases a, a of the second stage stacked on the elevating conveyor at the middle position in the horizontal position, and the closing position for canceling the holding and fixing. Besides, guides plates 33, 33 are set up, oppositely to the both side edge parts of the case groups A, A held in the horizontal position by the holding arms 31, 31, and a guide plate 34 is erected opposingly to the front side edge part of the case group A held in the front row of the unloading side.

Supposing that the illustrated embodiment is composed as described herein, the unloading action of case a by the case unloading apparatus 1 is described below.

First, as shown in FIG. 1 and FIG. 2, the pressure plates 17, 17 of the apparatus main body 3 waiting at the case unloading position on the transporting conveyor are preliminarily released, and the pallet P mounted on the transporting conveyor 2 is conveyed to the case unloading position, and the aligning plate 13 set up at the pallet discharge side at the same position is hit against the ease groups A, A of the front row side stacked up on the pallet P. At the same time, the pressure plates 17, 17 of the apparatus main body 3 arc hit against the case groups A, A of the rear row side stacked up on the pallet P, and the direction of the case groups A, A stacked up on the pallet P is aligned in the unloading direction.

Consequently, as shown in FIG. 3, driving the case unloading machine 4 of the apparatus main body 3, the case groups A, A of the first row stacked up at the rear end of the feed side of the pallet are moved In the unloading direction by the case unloading plate 21, and the case groups A, A of the first row are moved onto the elevating conveyor 25 of the case separating machine 5 waiting at the middle stage position. At the same time, as shown in FIG. 4, the holding arms 31, 31 are respectively arrested to the cases a, a of the second stage from the bottom stacked up on the elevating conveyor 25, and the remaining case groups A, A of the upper sides are held in the horizontal position. Afterwards, as shown in FIG. 5, the elevating conveyor 25 is lowered to the bottom stage position, and the bottom stage cases a, a are separated, and the separated bottom stage cases a, a are mounted on the feed conveyor 30 from the elevating conveyor 25, and are conveyed to a next process (not shown).

Then, as shown in FIG. 6, raising the elevating conveyor 25 up to the top stage position, the remaining case groups A, A held by the holding arms 31, 31 are mounted on the elevating conveyor 25, and at the same time the holding by these holding arms 31, 31 is released. In consequence, the elevating conveyor 25 is lowered to the middle stage position, and the holding arms 31, 31 of the cases a, a of the second stage from the bottom mounted on the elevating conveyor 25 are held, and the elevating conveyor 25 is lowered to the bottom stage position, and the cases a, a of the bottom stage are separated, and the separated bottom stage cases a, a are put on the feed conveyor 30 from the elevating conveyor 25, and are sent to a next process (not shown). Similarly, thereafter, the remaining case groups A, A held by the holding arms 31, 31 are sequentially separated from the lower stage side.

After end or before end of the separating action of the case groups A, A of the first stage, the case unloading plate 21 of the case unloading machine 4 is returned and moved to the backward position, and after completion of separating action, the elevating of the elevating conveyor 25 is stopped at the middle stage position horizontal to the pallet P conveyed to the case unloading position of the transporting conveyor 2, and the holding arms 31, 31 borne at both sides of the upper part are rotated and stopped in the opening position.

Similarly, thereafter, the apparatus main body 3 is moved sequentially for the moving stroke for unloading the case groups A, A of one row portion, and the case groups A, A of the third row, fourth row and fifth row stacked up on the pallet P are aligned by the pressure plates 17, 17, and the case groups A, A of these rows are sequentially separated from the bottom stage side, and tile separated cases a, a are sequentially transferred from the elevating conveyor 25 onto the feed conveyor 30, and are sent to a next process (not shown).

Next, after completion of unloading work of all cases a, A stacked up on one pallet P, as shown in FIG. 1, the transporting conveyor 2 is rotated and driven in the feed direction, and an empty pallet P put on the transporting conveyor 2 is conveyed and supplied to a pallet stacking machine (not shown) to be stacked and collected. On the other hand, the pressure plates 17, 17 of the apparatus main body 3 are released, and moved to the initial state position, and the next pallet P stacking up five cases a is conveyed and fed to the case unloading position, and the case groups A, A of the first to fifth row stacked up on the pallet P are sequentially unloaded row after row, and the case groups A, A of these rows are sequentially separated from the bottom stage side, and the separated cases a, a are sequentially transferred from the elevating conveyor 25 onto the feed conveyor 30, and are sent to a next process (not shown).

In this way, after aligning the case groups A, A stacked up on the pallet P in the unloading direction, the case groups A, A of one row portion stacked up on the elevating conveyor 25 are sequentially separated from the bottom stage side, and therefore the unloading job of the cases a stacked up on the pallet P may be done mechanically, and the unloading work may be saved in labor and enhanced in efficiency.

Or, the case unloading machine 4 and case separating machine 5 are waiting at the case unloading position on the transporting conveyor 2, and the pallet P mounted on the transporting conveyor 2 is fed intermittently only by the moving extent for unloading the case groups A, A of one row portion, and the case groups A, A of plural rows stacked up on the same pallet P may be unloaded sequentially.

Furthermore, two or three case separating machines 5, 5 are moved to the case unloading side of the case unloading machine 4, and the case groups A, A of one row portion unloaded from the pallet P are distributed and supplied into the individual case separating machines 5, 5 so that the unloading time of all case groups A, A stacked up on the pallet P may be shortened, and the job efficiency may be enhanced.

FIGS. 7, 8, 9, and 10 refer to other embodiments of the case separating machine, and therefore in the second, third fourth, and fifth embodiments, the constituent elements 25, 26, 29, 31, and 32 having the same functions as in the first embodiment are identified with same reference numerals, and their detailed descriptions are omitted.

Figure 7:
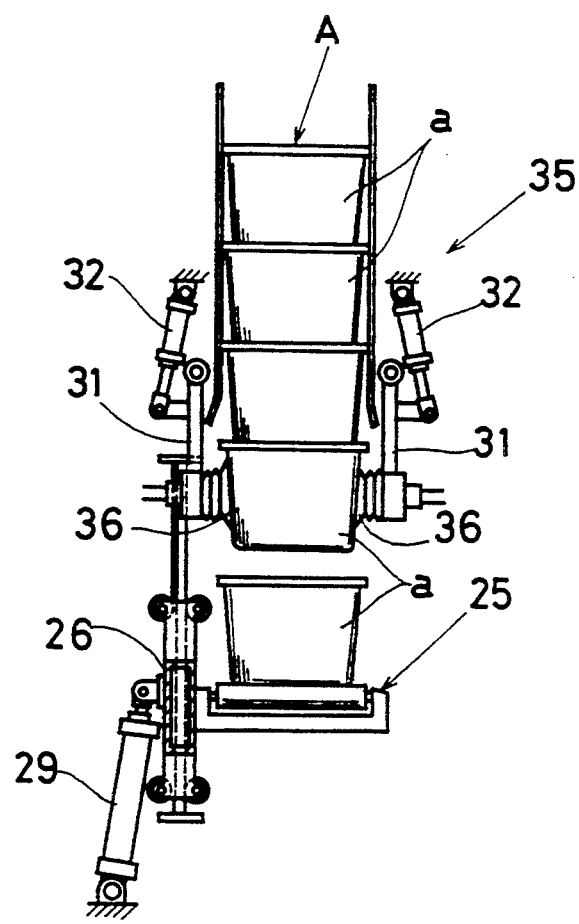
FIG. 7 is a front view showing a case attraction state by a case separating machine In a second embodiment.

FIG. 7 shows a case separating machine 35 in the second embodiment for separating by attracting and holding the case groups A stacked up in five stages, and this case separating machine 35 has attractors 36, 36 made of synthetic rubber or the like fixed to the lower end parts of the confronting sides of the holding arms 31, 31 pivoted at the right and left positions, and has attractors 36, 36 adhered to the cases a, a of the second stage from the bottom mounted on the elevating conveyor 25, and the cases a, a are attracted and held by the negative pressure of an intake blower (not shown) connected to the attractors 36, 36, and the negative pressure of the suction blower (not shown) connected to the attracters 36, 36 is cut off or stopped to cancel the attraction and holding of the cases a, a, so that the case groups A, A for one row portion mounted on the elevating conveyor 25 can be sequentially separated from the bottom stage side, same as in the first embodiment, and therefore the cases a formed in a smooth surface without shape or structure for holding by hand may be securely separated.

Figure 8:
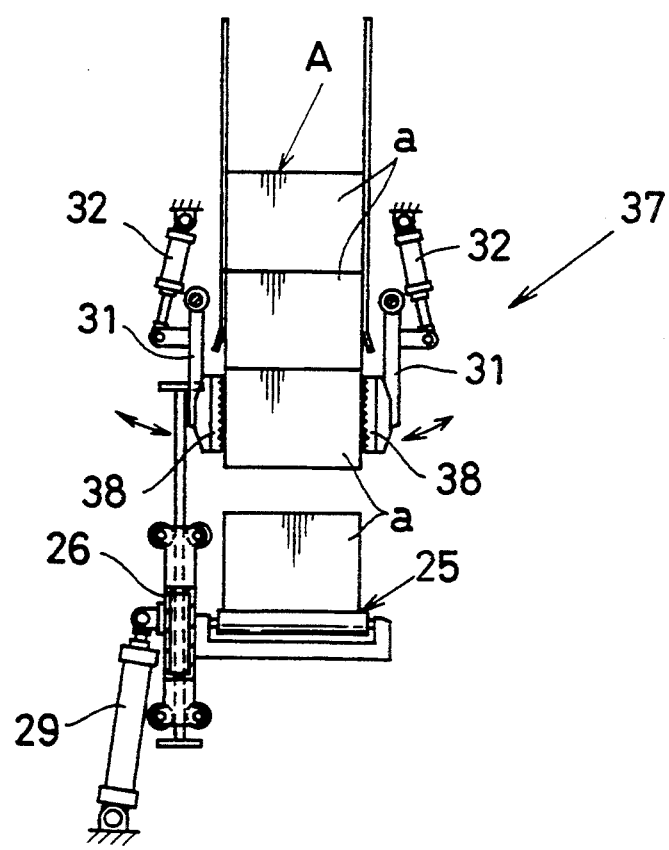
FIG. 8 is a front view showing a case pressing state by a case separating machine in a third embodiment.

FIG. 8 shows a case separator 37 in the third embodiment for separating by pressing and holding the case groups A stacked up In five stages, and this case separating machine 37 has pressure pads 38, 38 made of synthetic rubber or the like fixed to the lower end part of the confronting sides of the holding arms 31, 31 pivoted at the right and left positions, and the pressure pads 38, 38 are pressed to the cases a, a of the second stage from the bottom stacked up on the elevating conveyor 25, and the remaining case groups A, A of the upper stages are held in the horizontal position by the mutual surface resistance, and therefore same as in the first embodiment, the case groups A, A of one row portion stacked up on the elevating conveyor 25 can be sequentially separated from the lower stage side, so that the cases a formed in a smooth surface without the shape or structure for holding by hand can be separated securely.

Figure 9:
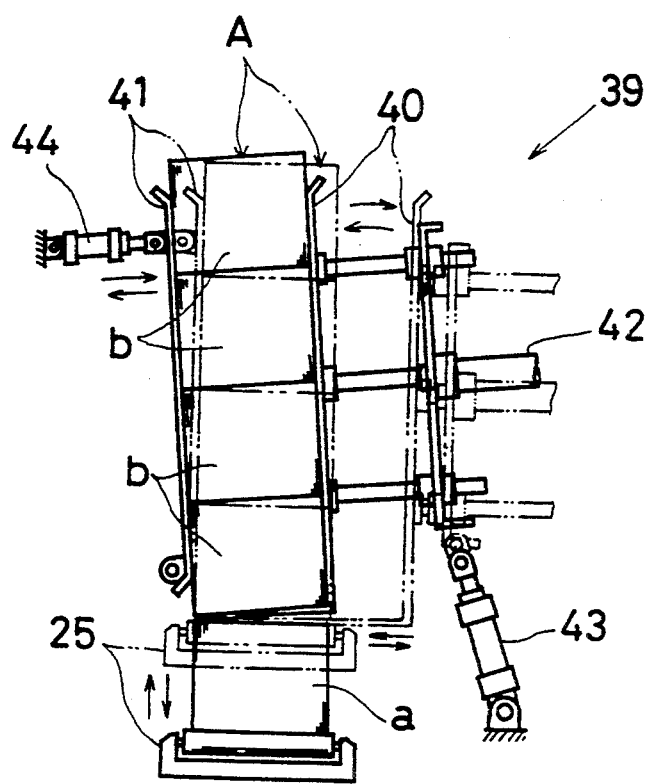
FIG. 9 is a front view showing a case inclining state by a case separating machine in a fourth embodiment.

FIG. 9 shows a case separating machine 39 in the fourth embodiment for separating by inclining the case groups A stacked up in five stages, and this case separating machine 39 had L-shaped case slope plates 40 disposed at one side position confronting the case groups A, A of the upper stages, except for the cases a, a of the bottom stage stacked up on the elevating conveyor 25, while case support plates 41 are disposed at the other side position confronting the case groups A, A of the same upper stages.

That is, operating an insertion cylinder 42 linked to the case slope plate 40, the case slope plate 40 is inserted into the junction sides of the cases a, a stacked up on the second stage from the bottom and the cases a, a of the bottom stage stacked up on the elevating conveyor 39, while the case groups A, A of the remaining upper stages are pressed against the case support plate 41 set up at the other side position. Afterwards, the slope cylinder 43 linked to the lower end part of the case slope plate 40, and the slope cylinder 44 linked to the upper end part of the case support plate 41 are operated in synchronism, and while holding the case groups A, A of the remaining upper stages, the case slope plate 40 and the case support plate 41 are inclined to a specific angle, thereby separating the bottom stage cases a, a mounted on the elevating conveyor 25, and the remaining upper stage case groups A, A.

Thereafter, similarly, operating the cylinders 42, 43, 44, the remaining upper stage case groups A, A mounted on the elevating conveyor 42 are sequentially separated from the bottom stage side, and therefore same as in the first embodiment, the case groups A, A of the one row portion mounted on the elevating conveyor 25 may be sequentially separated from the bottom stage side, and hence the cases a formed in a smooth side surface without shape or structure for holding by hand may be separated securely.

Figure 10:
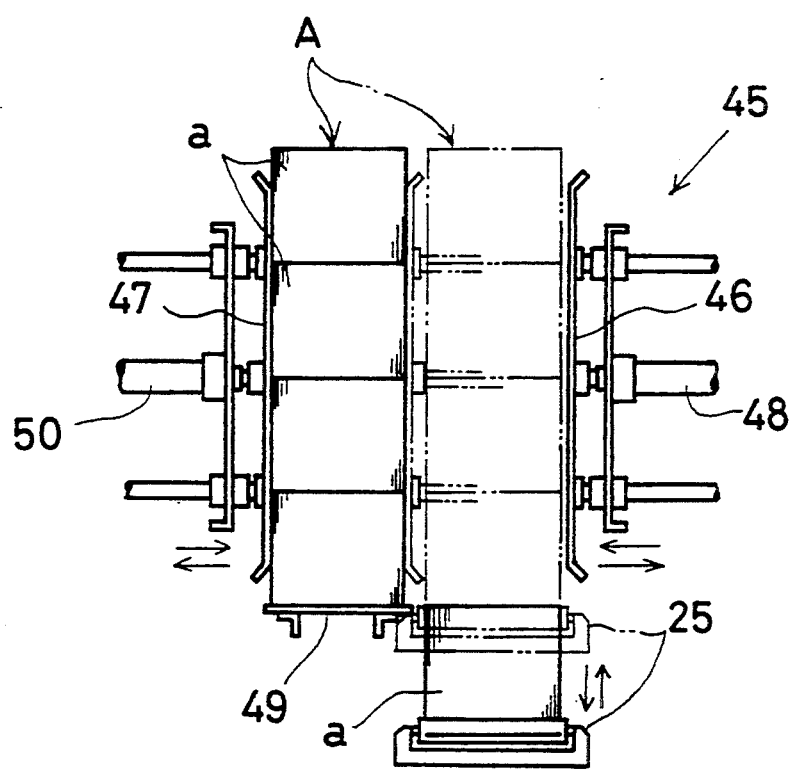
FIG. 10 is a front view showing a case horizontal move state by a case separating machine in a fifth embodiment.

FIG. 10 shows a case separating machine 45 in the fifth embodiment for separating by moving horizontally the case groups A stacked up in five stages, and this case separating machine 45 and has case moving plates 46 disposed at one side position confronting the case groups A, A of the upper stage side except for the cases a, a of the bottom stage mounted on the elevating conveyor 25, while case returning plates 46 are disposed at the other side position confronting the case groups A, A of the same upper stage side.

That 1s, operating the moving cylinder 48 coupled to the case moving plate 46, the case groups A, A of the upper stages except for the cases a, a of the bottom stage mounted on the elevating conveyor 25 are once transferred onto a receiving plate 49 set up at the same position side, and the bottom stage cases a, a mounted on the elevating conveyor 25 and the case groups A, A of the remaining upper stages are separated. Afterwards, operating the returning cylinder 50 coupled to the case returning plate 47, the case groups A, A of the remaining upper stages left over on the receiving plate 49 are transferred onto the elevating conveyor 25.

Similarly, thereafter, operating the cylinders 48, 50, the remaining case groups A, A of the upper stages mounted on the elevating conveyor 25 are sequentially separated from the bottom side, and therefore same as in the first embodiment, the case groups A, A for the one row portion mounted on the elevating conveyor 25 can be sequentially separated from the bottom stage side, and therefore the cases a formed in a smooth side surface without shape or structure for holding by hand may be separated securely.

Figure 11:
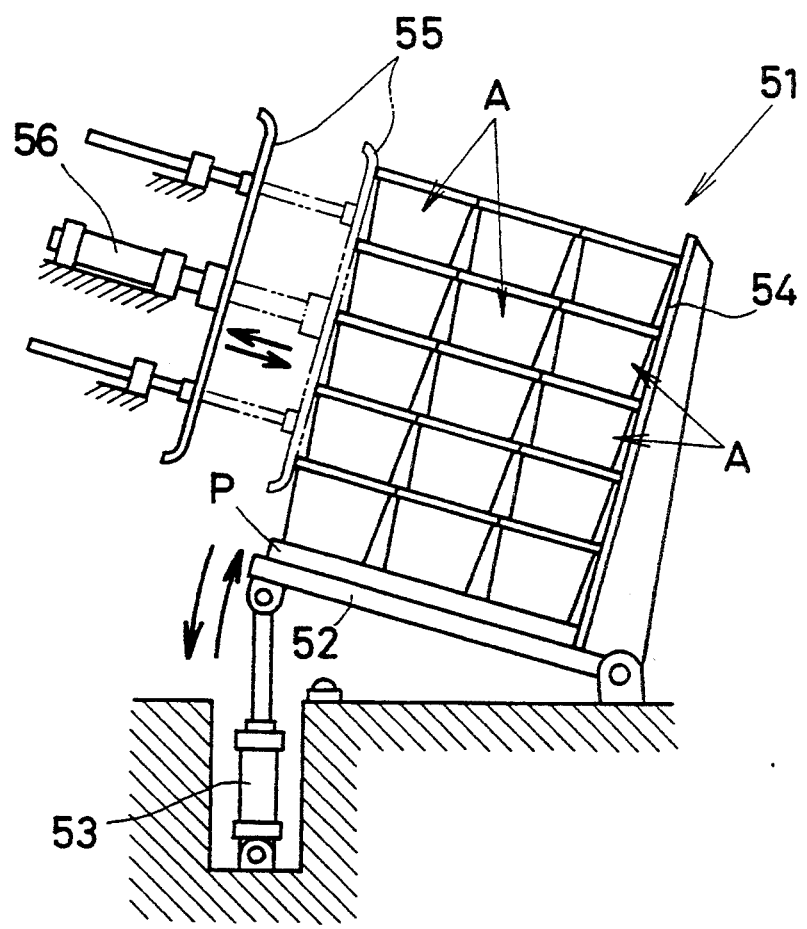
FIG. 11 is a side view showing a case inclining state by a case aligning machine in a sixth embodiment.

FIG. 11 shows a case aligning machine 51 in the sixth embodiment for aligning by inclining the case groups A, A stacked up on the pallet P, and this case aligning machine 51 pivots a slope table 52 rotatably in the vertical direction on the case aligning position on the transporting conveyor 2, and the pallet P mounting case groups A, A in plural rows is transferred onto the slope table 52, and by operating a tilting cylinder 53 coupled with the slope table 52, the slope table 52 is tilted to a desired angle while mounting the pallet P, and one side face of all case groups A, A stacked up on the same pallet P is hit against an aligning plate 54. At the same time, operating a pressure cylinder 56 linked to the pressing plate 55, the other side face of all cases A, A stacked up on the pallet P is pressed and aligned by the pressure plate 55, so that the case groups A, A stacked up on the pallet P may be aligned easily.

Figure 12:
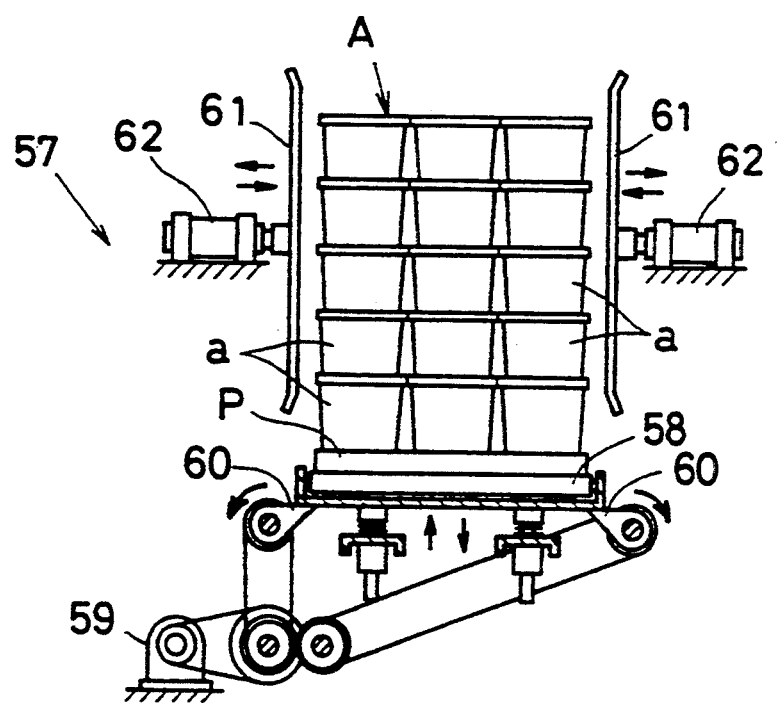
FIG. 12 is a side view showing a case dropping action by a case aligning machine In a seventh embodiment.

FIG. 12 shows a case aligning machine 57 for aligning in the midst of falling of the case groups A, A stacked up on the pallet P, and this case aligning machine 57 supports an elevating table movably in the vertical direction on the case aligning position on the transporting conveyor 2, and the pallet P stacking up case groups A, A in plural rows is transferred on the elevating table 58, and rotary blades 60, 60 pivoted at both sides of the lower part are rotated in the lifting direction by the driving force of a rotary motor 59 with reduction gear, and the pallet P transferred on the elevating table 58 is moved up and down. At the same time, operating aligning cylinders 62, 62 linked to the case aligning plates 61, the four sides of the case groups A, A stacked up on the pallet P are pressed by the aligning plates 61, 61, the front aligning plates 11, 11 are pressed to the front side of the case group 2D, and the direction of the case groups A, A stacked up on the pallet P are aligned in tile midst of falling, so that the case groups A, A stacked up on the pallet P may be easily aligned.

If, meanwhile, it is impossible to align the case groups A, A stacked up on the pallet P in one stroke of vertical fall, the case groups A, A stacked up on the pallet P are dropped plural times and aligned.

Figure 13:
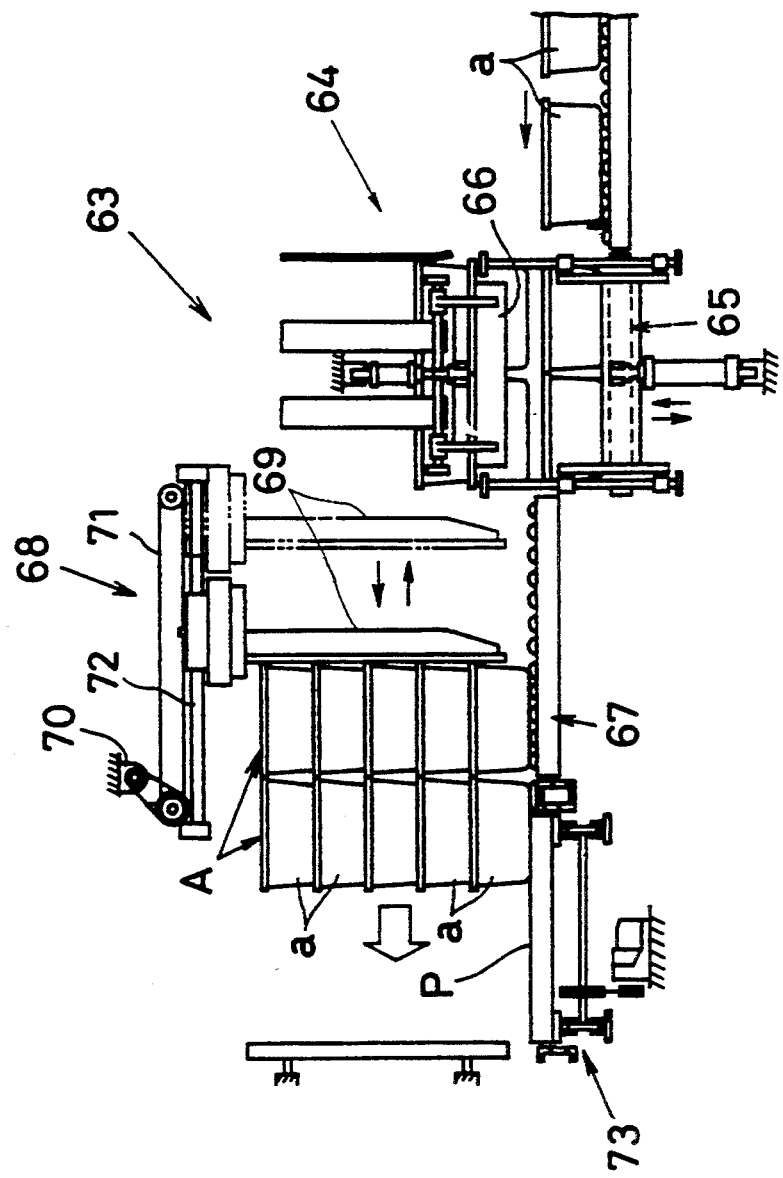
FIG. 13 is a side view showing a loading action by a case loading apparatus In an eighth embodiment.
Figure 14:
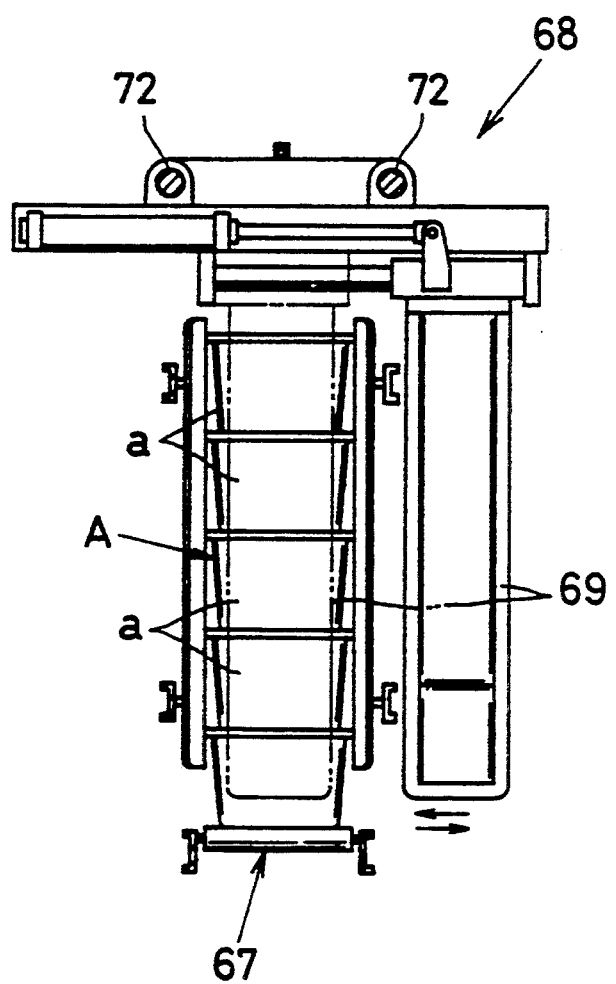
FIG. 14 is a back view showing a case loading action by a case loading machine.

FIG. 13 and FIG. 14 show a case loading apparatus 63 for loading the cases a containing objects sequentially on the pallet P by stacking up in five stages, and this case loading apparatus 63 moves up and down an elevating conveyor 64 of a case stacking machine 64 for composing the apparatus to sequentially lift the cases a, a for the portion of one stage stacked up on the elevating conveyor 65, while the cases a, a of one stage stacked up on the elevating conveyor 65 are held in the horizontal position by holding arms 66, 66 pivoted at the right and left positions. Furthermore, the cases a, a of the fifth stage stacked up on the elevating conveyor 65 are stacked up on the cases a, a in the bottom stage held by the right and left holding arms 66, 66, and by rotating and driving the elevating conveyor 65 in the loading direction, the case groups A, A of one row portion stacked up in five stages are mounted on the loading conveyor 67.

At the same time, the case loading plate 69 of the case loading machine 68 disposed upward at the same position is moved to a position confronting the case group A in the rear row side mounted on the loading conveyor 67, and the traveling chain 71 is rotated in the traveling direction by the driving force of a traveling motor 70 with reduction gear, and the case loading plate 69 linked to the traveling chain 71 is moved in the case loading direction along the traveling rails 72, 72, and the case groups A, A for one row mounted on the loading conveyor 67 are transferred onto the pallet P conveyed to the case loading position on the transporting conveyor 73.

Thereafter, similarly, an empty pallet P put on the transporting conveyor 73 or the case loading machine 68 are relatively moved by the moving extent for loading the case groups A, A for one row, and the case groups A, A of one row mounted on the loading conveyor 67 are sequentially load onto the pallet P, so that the heavy cases a containing objects may be easily loaded.

It is also possible to hold sequentially the cases a, a for one stage stacked up on the elevating conveyor 65 by using the case holding means in the second embodiment and third embodiment.

What is claimed is:

1. A system for unstacking at least one case from a pallet on which are disposed a plurality of units disposed in an array of a plurality of rows and columns, each of said units comprising a plurality of cases vertically stacked on each other, said columns being defined in a first horizontal direction of movement of a first conveyor means, and said rows being defined in a direction perpendicular to said first horizontal direction of movement of said first conveyor means, said system comprising, in combination a first conveyor means for holding said pallet, said first conveyor means being movable in said first horizontal direction;

a second conveyor means for holding only a single row of said units of vertically stacked cases immediately after removal thereof from said pallet on said first conveyor means, said second conveyor means being located adjacent to said first conveyor means and being movable in a horizontal direction perpendicular to said first horizontal direction in which said first conveyor means is movable;

means for moving horizontally at a time a single row of said units of vertically stacked cases disposed on said pallet from said first conveyor means onto said second conveyor means, said means for moving comprising an arm movable in a direction perpendicular to said first horizontal direction and having a vertical dimension greater than the total dimension of the vertically stacked cases of each said unit, and means for moving the arm to move said single row of stacked cases from said first conveyor means onto said second conveyor means;

means for selectively holding the vertically stacked cases in each unit of said single row when said single row of units is on said second conveyor means;

means for vertically moving said second conveyor means to separate at least one case in each unit of said single row when said single row is on said second conveyor means;

means for operating said second conveyor means to move horizontally said at least one case in each unit not held by said means for selectively holding onto a third conveyor means; and a third conveyor means for holding said at least one case in each unit of said single row moved from said second conveyor means.

2. The system of claim 1, wherein said means for selectively holding further comprises means for holding and vertically lifting all of the vertically stacked cases from each unit in said single row, except the bottom most cases closest to said second conveyor means.

3. The system of claim 1, wherein said means for selectively holding comprises means for tilting a row of units of vertically stacked cases.

4. The system of claim 1, wherein said means for selectively holding comprises means for horizontally moving all of the vertically stacked cases of each unit in said single row, except the bottom most cases closet to said second conveyor means.

5. The system of claim 1, wherein said means for moving comprises a fourth conveyor means interposed between said first conveyor means and said second conveyor means.

* * * * *